(12) United States Patent
Szczepanski et al.

(10) Patent No.: US 9,451,581 B1
(45) Date of Patent: Sep. 20, 2016

(54) PROVIDING COMMERCIAL INFORMATION IN A GEOGRAPHIC APPLICATION

(71) Applicant: GOOGLE INC., Mountain View, CA (US)

(72) Inventors: Pawel Szczepanski, Tokyo (JP); Taj J. Campbell, San Francisco, CA (US); Koichi Suematsu, Tokyo (JP); Fred Vaucher, Mountain View, CA (US); Vikki Ku, Mountain View, CA (US); Rishi Agarwal, Kirkland, WA (US); Salahuddin Choudhary, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/794,626

(22) Filed: Jul. 8, 2015

Related U.S. Application Data (60) Provisional application No. 62/022,500, filed on Jul. 9, 2014.

(51) Int. Cl.
| | |
|---|---|
| *H04W 4/02* | (2009.01) |
| *H04W 64/00* | (2009.01) |
| *H04M 1/725* | (2006.01) |
| *H04W 68/00* | (2009.01) |

(52) U.S. Cl.
CPC ....... *H04W 64/006* (2013.01); *H04M 1/72544* (2013.01); *H04W 4/02* (2013.01); *H04W 68/005* (2013.01)

(58) Field of Classification Search
None
See application file for complete search history.

(56) References Cited

U.S. PATENT DOCUMENTS

| | | | | |
|---|---|---|---|---|
| 2007/0250901 | A1* | 10/2007 | McIntire | H04N 7/17318 725/146 |
| 2014/0201126 | A1* | 7/2014 | Zadeh | G06K 9/627 706/52 |
| 2015/0135114 | A1* | 5/2015 | Zhang | G06F 3/04842 715/771 |

* cited by examiner

*Primary Examiner* — Diane Mizrahi
(74) *Attorney, Agent, or Firm* — Marshall, Gerstein & Borun LLP (57) ABSTRACT

A current context of a geographic application executing on a user device is determined. Commercial geographic content is selected for presentation at the user device based at least in part on the determined current context, and the commercial geographic content is provided to the user device via a communication network. A first indication is received, indicating that the commercial geographic content was presented at a first level of detail via a user interface of the user device. In response to the first indication, a first metric is updated. As second indication is received, indicating that the commercial geographic content was presented at a second level of detail via the user interface of the user device in response to user input, where the second level of detail is higher than the first level of detail. A second metric is updated in response to the second indication.

18 Claims, 5 Drawing Sheets

PROVIDING COMMERCIAL INFORMATION IN A GEOGRAPHIC APPLICATION

FIELD OF THE DISCLOSURE

The present disclosure relates to digital maps and, more particularly, to providing commercial information related to an interactive digital map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many computing devices support software applications that display interactive digital maps. Some of these software applications are special-purpose applications developed primarily for providing interactive digital maps. Other software applications, such as web browsers, are general-purpose applications that display interactive digital maps along with other content. These special- and general-purpose software applications, which for convenience can be referred to as "geographic applications," can execute on various computing devices, including portable devices such as smartphones.

SUMMARY

A geographic application can display an interactive list of geographic items, such as search results in response to a query, or automatic suggestions related to the currently displayed digital map, for example, where each of the items is presented as an informational card occupying a portion of a display. The geographic application also can display commercial content, such as an advertisement, as one of the items in the list. In response to certain user input, the geographic application can generate an expanded view of the item and report the expanded presentation of the item to a network server, which in response can adjust an effectiveness metric for the commercial content and/or generate a charge for the advertiser. When the user chooses to further interact with the commercial content displayed as part of the item, the geographic application can report these interactions separately.

More particularly, one implementation of these techniques is a method for monitoring effectiveness of presenting commercial information at user devices. The method can be executed by one or more computing devices. The method includes determining a current context of a geographic application executing on a user device, selecting commercial geographic content for presentation at the user device based at least in part on the determined current context, and providing the commercial geographic content to the user device via a communication network. The method also includes receiving a first indication indicating that the commercial geographic content was presented at a first level of detail via a user interface of the user device, updating a first metric in response to the first indication, receiving a second indication indicating that the commercial geographic content was presented at a second level of detail via the user interface of the user device in response to user input, such that the second level of detail is higher than the first level of detail, and updating second metric in response to the second indication.

Another implementation of these techniques is a system including a database, a network interface to access a user device via a communication network, and processing hardware coupled to the database and the network interface. The database is implemented in a non-transitory computer-readable medium and stores commercial geographic content for presentation at user devices. The processing hardware the processing hardware configured to (i) select commercial geographic content from the database for presentation at the user device, (ii) provide the commercial geographic content to the user device via the network interface, (iii) receive, via the network interface from the user device, a first indication indicating that the commercial geographic content was presented at a first level of detail via a user interface of the user device, (iv) update a first metric in response to the first indication, (v) receive, via the network interface from the user device, a second indication indicating that the commercial geographic content was presented at a second level of detail via the user interface of the user device in response to user input, wherein the second level of detail is higher than the first level of detail, and (iv) update a second metric in response to the second indication.

Yet another implementation of these techniques is a method for providing commercial information in a geographic application. The method can be executed by one or more processors. The method includes receiving, via a communication network, commercial content related to a current geographic context, where the current geographic context includes at least a geographic area of interest. The method further includes providing, via a user interface, an informational sheet with the commercial content at a first level of detail, detecting, a request for additional detail related to the informational sheet, and, in response to the request for additional detail: (i) providing, via the user interface, the informational sheet with the commercial geographic content at a second level of detail, where the second level is higher than the first level of detail, and (ii) transmitting, to the network server, an indication of the commercial content being displayed at a second level of detail.

DETAILED DESCRIPTION

Overview

Generally speaking, a geographic application of this disclosure reports user interactions with commercial content to a network server, including interactions that do not ultimately result in selections of the commercial content by the user for the purpose of transacting business, sometimes referred to as "conversions." The commercial content can include advertisements, coupons, offers, other suitable types of proposals to transact business or convey commercial information, and any combination thereof. It will be understood that while referred to as "commercial information" here, content may relate to non-business interactions such as charities, public service announcements, government and public agency content, any other suitable content, or any combination thereof. The network server can use the reports to update one or several quantitative metrics that reflect user interaction with commercial content. In some implementations and/or configurations, the network server also generates an appropriate charge for the provider of the commercial content. For example, a "charge" may include an amount of money owed from the advertiser to the displayer of the commercial content. In addition to reporting interactions with commercial content, the geographic application can separately report conversions, so that the network can further update these and/or other metric(s).

The geographic application can receive the commercial content in response to providing an indication of its current context to one or more network servers. The current context can include, for example, one or more of the following: an indication of the geographic area selected by the user via the geographic application, an indication of the geographic area in which the user device is located, one or more geographic search terms, an indication of a general category for which the geographic application is requesting suggestions, and other signals. An advertisement, a coupon, or an offer can be for a good or a service related the geographic area indicated in the current context.

The geographic application can present commercial content as one of items in the list of geographic search results, automatically generated suggestions, or other geographic items. Each item can be presented in an informational sheet, or an individually selectable window, beneath a digital map or obscuring a portion of the digital map, so that the user can scroll through the list without the items obscuring the entire digital map. The geographic application can display commercial content to generate an "impression," or an instance of presentation of the commercial content via a user interface. When the user interacts with the commercial content by requesting that the geographic application update the corresponding informational sheet, for example, the geographic application can report this interaction separately from the impression. Updating an informational sheet may include enlarging, resizing, moving, reproducing the content in a second window, etc. When the user chooses to select the commercial content via further interactions with the informational sheet, the geographic application can report a conversion for the commercial content.

In an example scenario, the user searches for a hotel within an approximately ten-block radius relative to her current location in central Tokyo using her smartphone. She launches the geographic application, which displays an interactive digital map approximately centered at her current location, and submits the query "hotels nearby." The geographic application sends a query that includes the search term "hotels," the user's current location in the form of Global Positioning Service (GPS) coordinates, the term "nearby" modifying the scope of the query, and an identifier of the user's smartphone, to a network server. The geographic application then receives an ordered list of search results, such as a listing of hotels ordered in accordance with the average review score, for example. The geographic application also receives a digital coupon for a free upgrade to a suite at a hotel not listed as one of the search results.

In this example scenario, the geographic application presents both the search results and the coupon in the form of informational sheets. One window is displayed at a time, obscuring a bottom portion of the digital map, and the user can step through the list by "swiping" the currently displayed informational sheet left or right. When the user reaches the coupon during the traversal of the list, the corresponding informational sheet can display only limited information, such as the name of the hotel and the general terms of the coupon, "Free upgrade to a suite." The user wishes to review the coupon in more detail and "pulls" the informational sheet upward. The geographic application in response displays a more detailed informational sheet for the coupon, including such information as the location of the hotel, date restrictions, etc.

When the geographic application displays the coupon with limited information as part of presenting the interactive list of items, the geographic application transmits, to the network server, an indication of an impression. The network server in response can update a first metric indicating presentation of commercial content via a user interface. The geographic application in this scenario then transmits, to the network server, a different message indicating that the user chose to view the coupon in detail. The network server updates a second metric indicating that the user expressed sufficient interest in the coupon to view its details. The network server also can generate a corresponding charge for the advertiser.

Continuing with the example scenario, the user likes the coupon and decides to download, save, or otherwise acquire the coupon. The user accordingly taps or clicks on the coupon to start the download. The geographic application generates yet another message indicating a conversion, and the network server updates a third metric and generates, or modifies, the charge for the advertiser. Each of the first, second, and third metrics discussed above can include a counter to record the number of times the corresponding event occurred.

More generally, the geographic application can implement different levels of presentation of the same commercial content, so that the network server can determine which commercial content was not presented to the user at all, which commercial content was presented to the user but failed to generate sufficient interest that lead to a customer interaction, which commercial content generated sufficient interest to prompt the user to view additional details, and which commercial content generated a conversion. The network server can utilize this information to generate appropriate charges and/or metrics and, more generally, allow providers of commercial content to better understand effectiveness of their business decisions.

An example system in which these techniques and/or similar techniques can be implemented is discussed next with reference to FIG. 1, followed by a discussion of several example screenshots and an example method.

Example System and Devices

Figure 1:
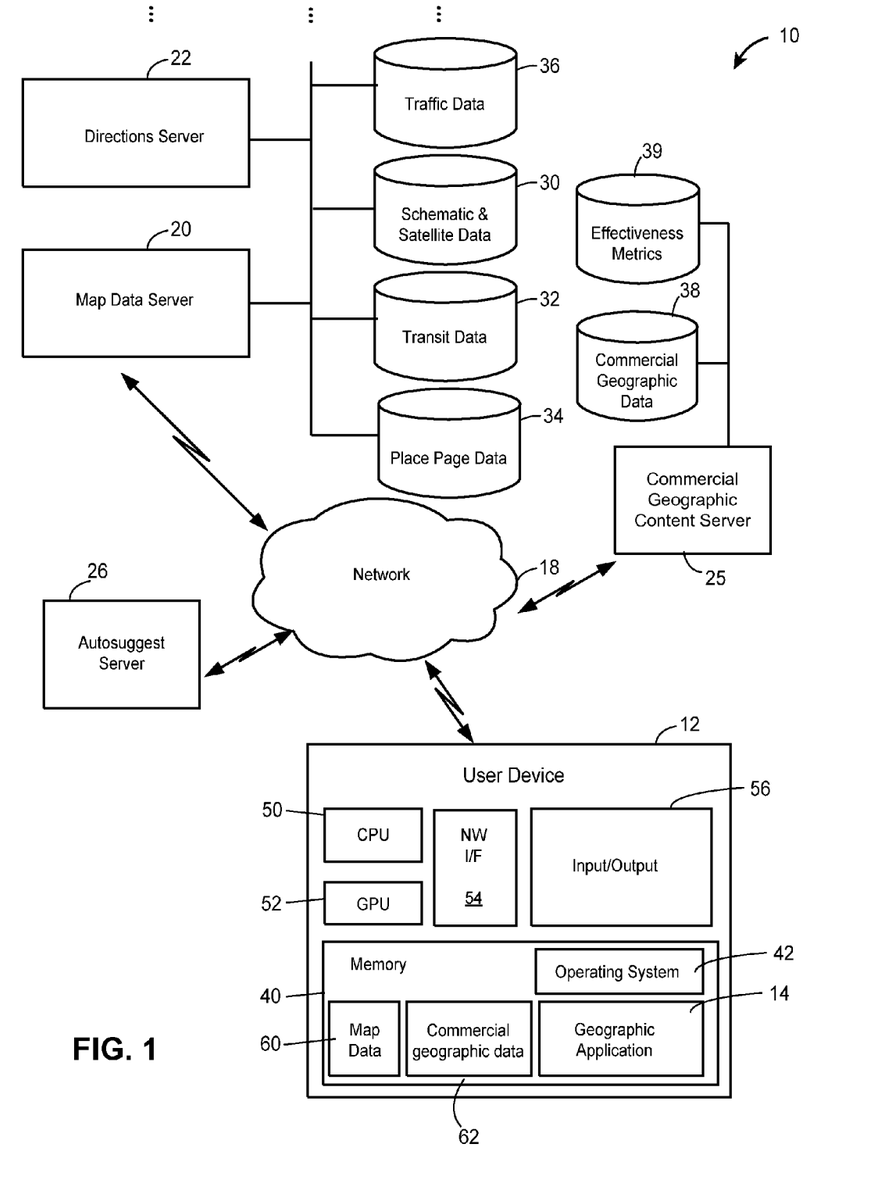
FIG. 1 is a block diagram of an example system in which commercial information can be provided in a geographic application in accordance with the techniques of this disclosure.

FIG. 1 illustrates an example communication system 10 in which a user device 12 executes a geographic application 14 that provides geographic content such as interactive digital map, results of geospatial search queries, geographic suggestions, commercial geographic content, and other geospatial data. In addition to the user device 12 and any suitable number of user devices, the communication system 10 includes can include one or more geospatial content servers such as a map server 20 configured to provide map data for rendering digital maps on client devices, a directions/navigation server 22 configured to provide step-by-step navigation directions, an autosuggest server 26 configured to provide automatic geospatial suggestions to client devices, and a commercial geographic content server 25 provides commercial geographic content such as advertisements, offers, and coupons, for example.

For simplicity, FIG. 1 depicts the servers 20, 22, 25, and 26 as individual servers. In general, however, each of the servers 20, 22, 25, and 26 can be implemented as any suitable network device or a group of network devices. More particularly, each of the servers 20, 22, 25, and 26 can include processing hardware such as one or more computing devices coupled to non-transitory computer-readable memory such as persistent memory, such as a hard disk or a flash drive, and/or transient memory, such as a random-access memory (RAM).

The map server 20 in the example implementation of FIG. 1 is communicatively coupled to several databases such as a (i) a schematic and satellite database 30 storing street and road information, topographic data, satellite imagery, etc., (ii) a transit database 32 storing information related to public transport routes, schedules, alerts, prices, etc., (iii) a place page data 34 storing information about businesses including addresses, hours of operations, customer reviews, etc., (iv) a traffic database 36 storing current traffic conditions, and other databases. In general, the map server 20 can receive information related to geographic locations from any number of suitable databases, web services, etc. One or more operators can periodically update each of the databases 30-36 at respective frequencies. For example, the traffic database 36 may store real-time data, whereas the schematic and satellite database 30 may be updated relatively infrequently, such as once a week. Although FIG. 1 depicts the databases 30, 32, 34, and 36 as separate devices, these databases in general can be implemented in any suitable number of devices including non-transitory computer-readable memory. In various implementations, the databases 30, 32, 34, and 36 can be implemented in a single device or in several separate devices.

The commercial geographic content server 25 can be coupled to a commercial geographic database 38 that stores commercial geographic content such as advertisements, offers, coupons, etc. for various geographic areas and various topics of interest. The commercial geographic content server 25 can include text, images, links, audio content, video content, and other types of data. The commercial geographic content server 25 also can be coupled to an effectiveness metric database 39 that stores effectiveness metrics for the commercial content. For example, the effectiveness metric database 39 can store counters to keep track of the impressions, counters to keep track of the numbers of detailed presentations of commercial content at user devices, counters to keep track of conversions, and other metrics. Depending on the implementation, the effectiveness metric database 39 can store any number of metrics to keep track of impressions, detailed presentations, conversions, etc. for individual advertisements, coupons, offers, and other types of commercial content, as well as various aggregate metrics to keep track of commercial content for businesses, types of commercial content, types of users, etc.

The schematic and satellite database 30 can store data in a raster format, a vector format, or both. Further, in some implementations, the data is organized into map tiles at multiple zoom levels to facilitate serving map data to client devices. Depending on the implementation, the map data server 20 can provide map and directions data to client devices separately or together in map tiles, for example.

In an example implementation, the computing device 12 is a portable device that includes processing hardware such one or more processors (CPU) 50 coupled to a memory 40, a graphics processing unit (GPU) 52, a network interface unit 54, and an I/O module 56. The memory 40 may be tangible, non-transitory memory and may include any types of suitable memory modules, including random access memory (RAM), read only memory (ROM), flash memory, other types of persistent memory, etc. In addition to the geographic application 14, the memory 40 stores an operating system (OS) 42 and one or more applications or modules. The operating system 42 may be any type of suitable operating system. The I/O module 56 may be a touchscreen, for example. More generally, these techniques can be implemented in other types of devices, such as laptop or desktop computers, car navigation units, etc.

The geographic application 14 generates a digital map using vector graphics data, raster tiles, or map data in any other suitable format for display on a screen. In some cases, the geographic application 14 generates a 3D mesh to be textured using photographic images or other suitable description of 3D geometry for a geographic area.

Depending on the implementation, the geographic application 14 is a separate executable made up of compiled instructions that execute directly on the operating system 42, instructions in a scripting language (or another suitable format) that are interpreted at run time by another application such as a web browser, a plugin that extends the functionality of another software application, etc. In one example implementation, the geographic application 14 is an "app" downloaded onto the portable computing device 12 from a web server. In another implementation, the geographic application 14 is a web browser. In yet another implementation, the geographic application 14 is a "cloud" application that executes primarily on one or more cloud servers (not shown) and exchanges input and output data with the computing device 12 in real time.

In operation, the geographic application 14 requests map data and, in some cases, other data from the map data server 20 and/or the autosuggest server 26. The request from the geographic application 14 can indicate the current geographic context such as the current location of the user device 12, the current position of the map viewport, the current selection layer selection for the digital map being displayed (basic, traffic, transit, etc.). The map data server 20 and/or the auto suggest server 26 can provide any suitable combination of data retrieved from one or more of the databases 30, 32, 34, and 36. The geographic application 14 can store the received information in the memory 40 as map data 60. Further, the commercial geographic content server 25 can select suitable commercial geographic data in accordance with the current geographic context reported by the geographic application 14. The commercial geographic content server 25 can provide the selected commercial geographic data to the user client device 12, to be stored as commercial geographic data 62 in the memory 40, for example. The commercial geographic content server 25 also can receive indications related to the commercial content being presented at the user device 12 and update the corresponding effectiveness metrics in the database 39.

In at least some implementations, the user operates certain controls on the user device 12 or on a website associated with the map data server 20, and/or installs certain applications to allow the servers 20, 25, and/or 26 to automatically provide automatic suggestions, provide commercial content to the user device 12, and/or receive indications of user interactions with the commercial content at the user device 12.

Providing Commercial Geographic Content as Part of an Interactive List

Figure 2:
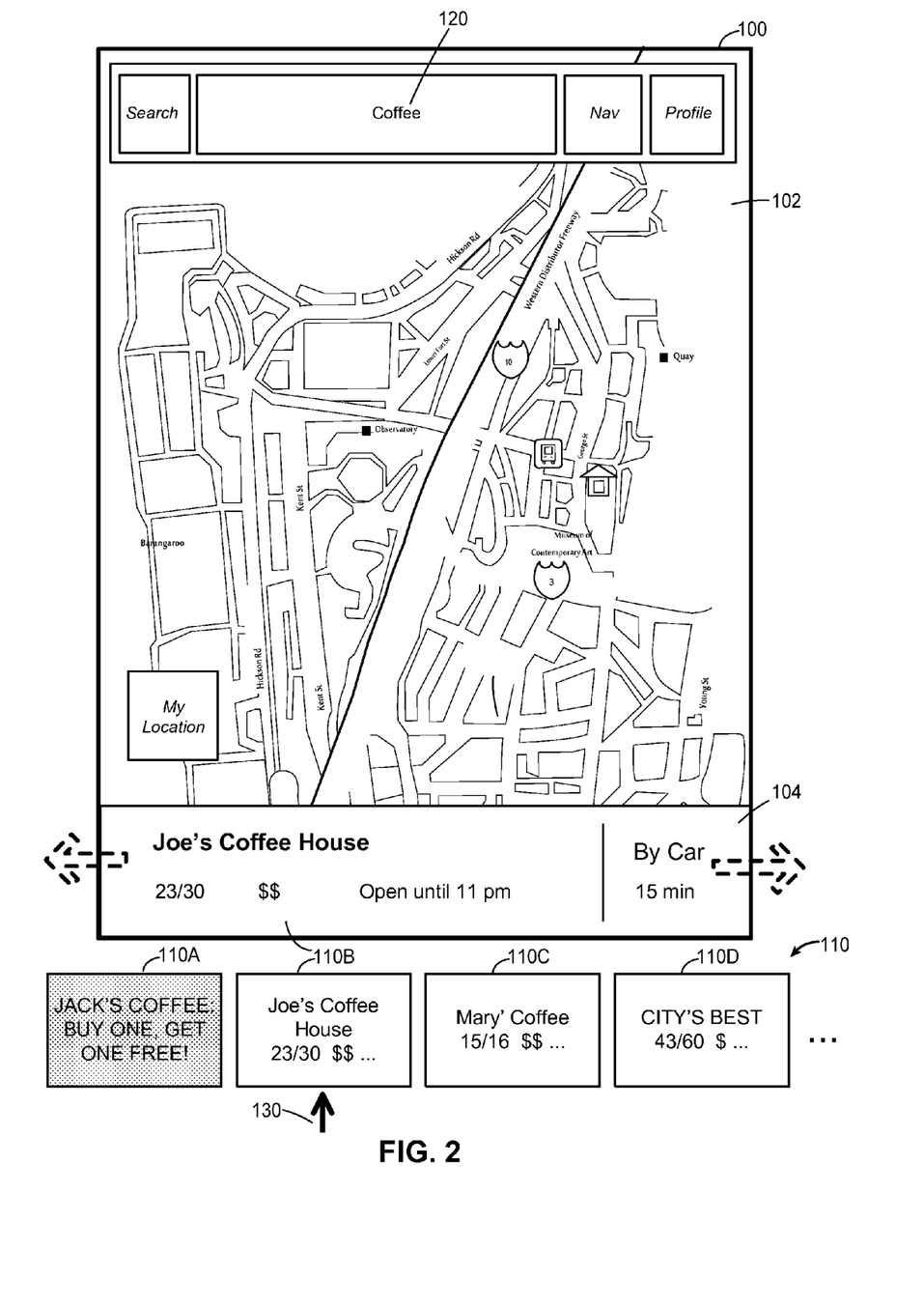
FIG. 2 illustrates an example screenshot which the geographic application operating in the system of FIG. 1 can generate to provide a list of geographic items including an item with commercial content, and a schematic view of the list of geographic items.

Referring to FIG. 2, a geographic application such as the geographic application 14 of FIG. 1 can generate a screenshot 100 to depict a digital map 102 and an informational sheet 104. The informational sheet 104 includes data corresponding to one of the "cards," or items in a list 110, schematically illustrated in FIG. 2 below the screenshot 100. More particularly, the informational sheet 104 displays data corresponding to the item 110B.

In this example scenario, the user input the search term "coffee" as a search term 120. The geographic application reported the search term 120 along with an indication of the current position of the viewport and/or other indications of the current context to one or more network servers (such as the servers 20, 25, and 26 of FIG. 1) and, in response, receives a list of search results to define items 110B, 110C, and 110D, as well as commercial content corresponding to item 110A. Each of the items 110B, 110C, and 110D describes a search result corresponding to the search term "coffee" and the selection of the geographic area. A description of a search result can include the name of a business, review information, price range, the location, and other potentially relevant information. The server(s) may have selected these search results based on one or several factors such as user reviews, proximity to the current location of the user's device, previously expressed user's preferences, etc. In some implementations, the server(s) also may have ranked the search results, so that item 110B appears before item 110C, item 110C appears before item 110D, etc.

The commercial content corresponding to item 110A can include an advertisement, an offer, a coupon, and/or other data related to a potential business transaction. The commercial content can be selected based at least in part on the reported context of the geographic application. More particularly, the commercial content can be selected in view of its relevance to the current map viewport, the search term 120 (and more, generally, one or more of the received set of search terms), the user's profile, etc. Further, the commercial content can be provided to a user device in a format that allows presentation at two or more levels of detail. In the example scenario of FIG. 2, commercial content of item 110A is a coupon which, at a first level of detail, includes the name of the business entity to which the coupon applies ("Jack's Coffee") and general terms of the coupon ("buy one, get one free."). At a second, higher level of detail, the commercial content of item 110A can also include restrictions on time, dates, the hours during which the business is open, etc.

In an example implementation, the screenshot 100 is provided via a touch interface, and the user can traverse the list 110 by swiping left or right, as indicated by arrows in FIG. 2. A pointer 130 schematically illustrates the current position of the list 100. Thus, in this example, if the user swipes to the right, item 110A displaces item 110B. If the user swipes to the left, item 110C is displayed. In one implementation, the list 110 is circular, so that the geographic application displays the first item on the list 110 when the user attempts to traverse the list 110 past its last item. In another implementation, the list 110 is implemented as a stack, so that the user can reach the first item only by moving from the last item through every intermediate item.

The geographic application can insert item 110A into the list 110 according to any desired scheme. For example, the geographic application can place item 110A at the top of the stack. When multiple items with commercial content are available, the geographic application can intersperse these items among the items with non-commercial information randomly, evenly (e.g., one after every five non-commercial items), or in any other desired manner. Non-commercial information can include search results, automatic suggestions, and other types of information that is not sponsored or presented by the geographic application in accordance with a payment.

In another implementation, the insertion of item 110A into the ordered list 110 and, more generally, the formation of the ordered list 110 is implemented on a network server rather than on the client device. For example, one or several of the servers 20, 25, and 26 of FIG. 1 can specify the order in which items 110A-110D are to be presented at a user device. In this manner, the one or several of the servers 20, 25, and 26 can ensure that commercial and non-commercial geographic content is presented in a similar manner on various platforms.

In the example implementation of FIG. 2, the geographic application displays informational sheets at the bottom of the screen. The geographic application provides only one informational sheet so as to obscure only a relatively small portion of the digital map 102. More generally, the geographic application may implement any suitable scheme for displaying the items in the list 110. For example, informational sheets can be displayed at the top, at the bottom, on the side, etc. Further, in some implementations, multiple informational sheets can be displayed on the screen at the same time.

Figure 3:
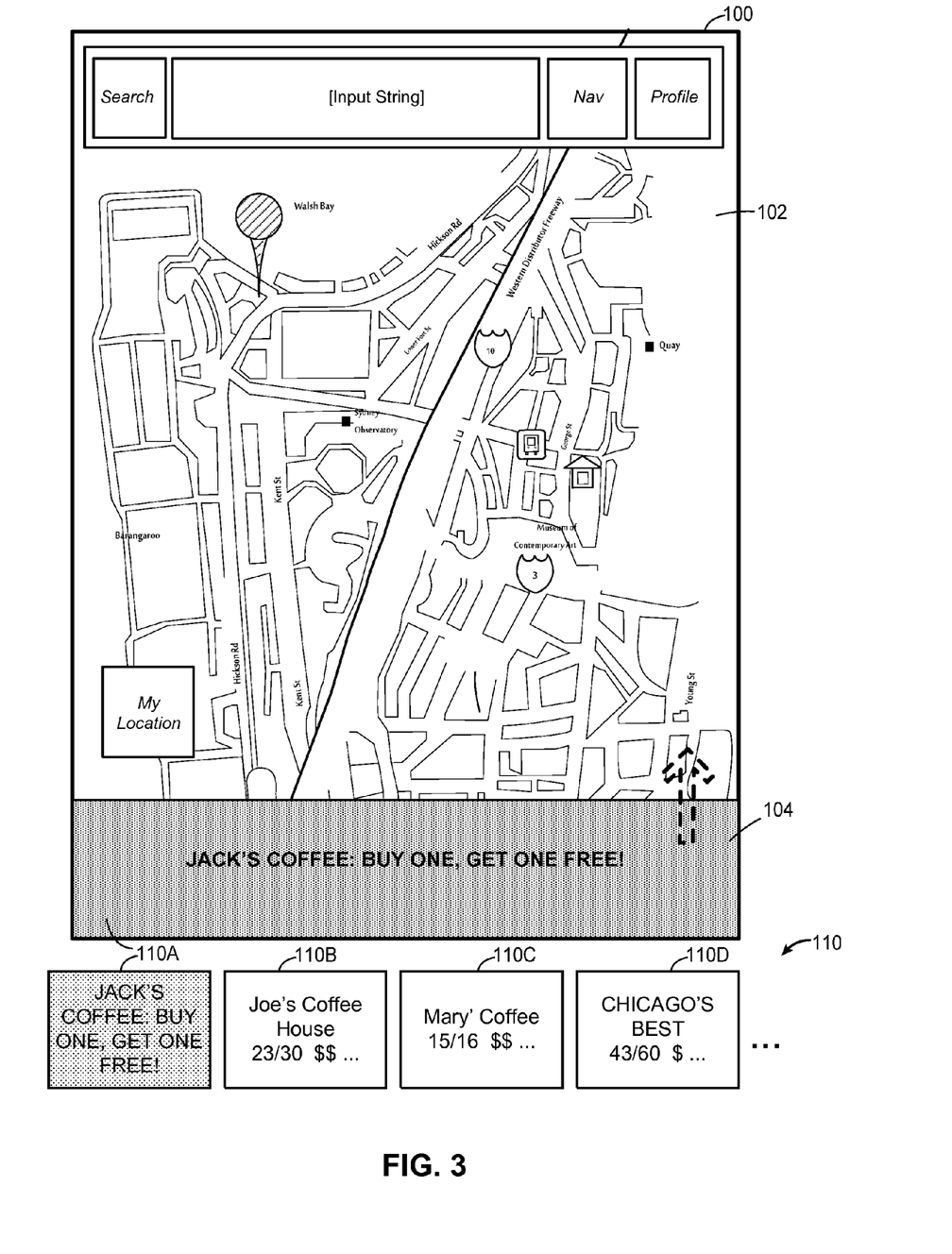
FIG. 3 is an example screenshot which the geographic application can generate when the current position within the list of geographic items of FIG. 2 corresponds to the item with commercial content.

The geographic application can visually indicate when commercial content, rather than search results or suggestions, is being displayed. As illustrated in FIG. 3, when the geographic application displays item 110A within the informational sheet 104, the informational sheet 104 is visually marked so as to alert the user to the difference between commercial and non-commercial content. For example, a different background color can be used.

When the geographic application displays item 110A within the informational sheet 104, the geographic application can report this impression of a network server. Referring back to FIG. 1, for example, the geographic application can provide an indication of an impression of item 110A to the commercial geographic content server 25, which in response can update one or several corresponding records in the database 39. It is noted that the geographic application can report the impression regardless of whether the user eventually chooses to view the item 110A in more detail, and regardless of whether the user eventually selects the item 110A to acquire the coupon.

Figure 4:
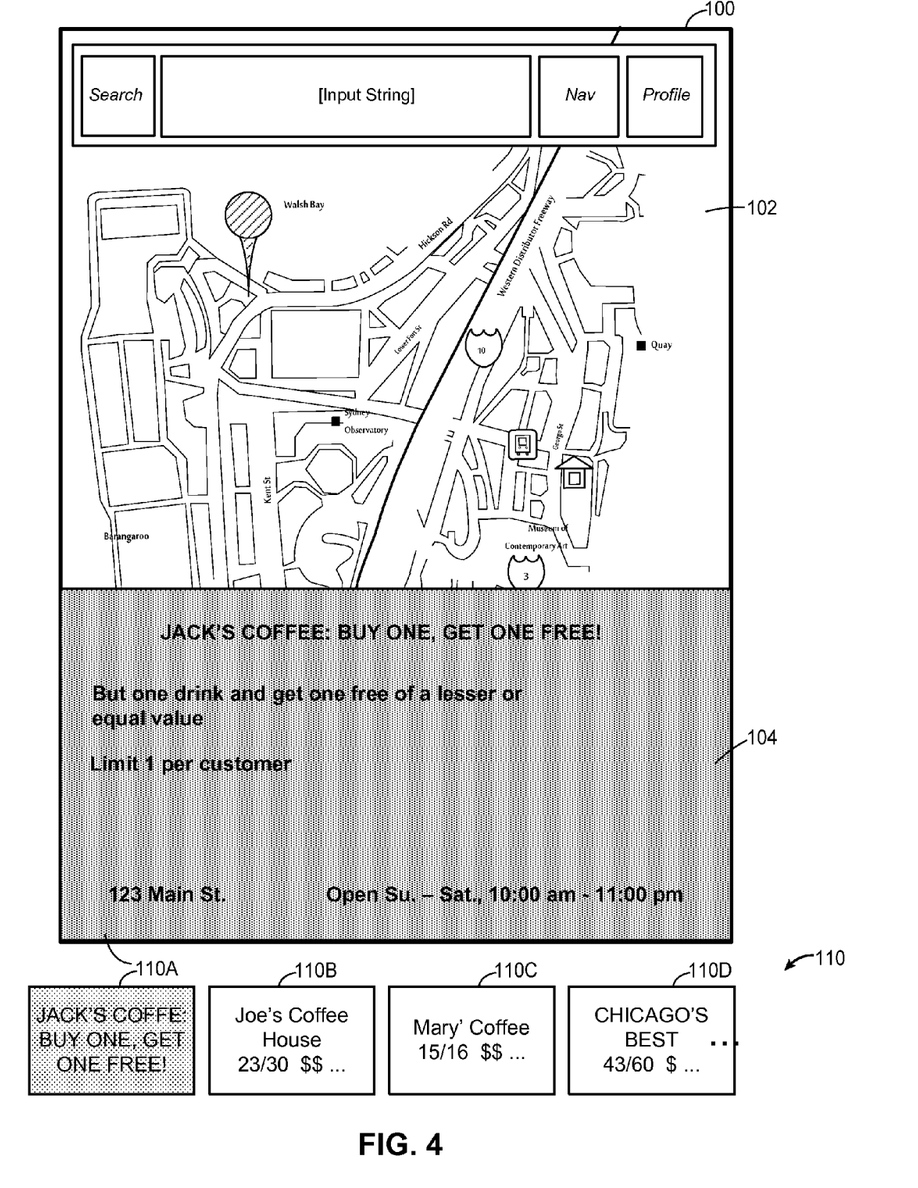
FIG. 4 is an example screenshot which the geographic application can generate to provide an expanded view of the item of FIG. 3.

As schematically illustrated in FIG. 3, the user can "pull" the informational sheet 104 from its current position upward to view the item 110A in more detail. As a more specific example, the user in this example can place her finger over the informational sheet 104 and move the finger in a generally upward direction while remaining in contact with the surface of the touchscreen, so as to communicate an upward motion to the informational sheet 104. FIG. 4 illustrates the informational sheet at a new position, following the user gesture. It will be understood that these interactions with the informational sheet 104 are merely examples of techniques that can used to display informational sheets and support user interactions with informational sheets. Other suitable user input can be received via a touch interface, a keyboard, a microphone, a camera, or another input device. The informational sheet 104 in FIG. 3 obscures a larger portion of the digital map 104. The informational sheet 104 in this state displays commercial content of the item 104A in greater detail. In particular, the informational sheet 104 now displays the additional terms of the coupon, indicates the location of the business, and specifies hours of operation for the business.

The geographic application can report the user's request to view the additional details to the network server. Similar to reporting the impression as discussed above, the geographic application can identify the item 110 to the network server and identify the type of presentation to distinguish the event from an impression, for example. In an example implementation, the commercial geographic content server 25 of FIG. 1 can update one or several corresponding records in the database 39. In some implementations, the commercial geographic content server 25 also generates a charge for the provider of the commercial content corresponding to item 110A.

In this manner, the commercial geographic content server 25 or another network server can more accurately analyze responses of users to commercial content, generate billing for providers of commercial content, determine future placement of commercial content, etc.

Referring generally to FIGS. 2-4, an item presented in the informational screen 104 in some cases can include several types of commercial content, such as an advertisement displayed next to an offer, for example. When the user pulls the informational sheet 104 upward by placing her finger on the portion of the informational sheet displaying the advertisement, the geographic application can provide a more detailed view of the advertisement, whereas when user places her finger on the portion of the informational sheet displaying the offer, the geographic application can provide additional details to the offer, within the informational sheet 104. The geographic application in this case can provide different notifications to the network server regarding the user's choice of detail. In another implementation, the informational sheet 104 provides the same detailed view of the advertisement and the offer in the informational sheet 104, but generates different indications depending on whether the application identifies user-expressed interest in the advertisement or in the offer.

Figure 5:
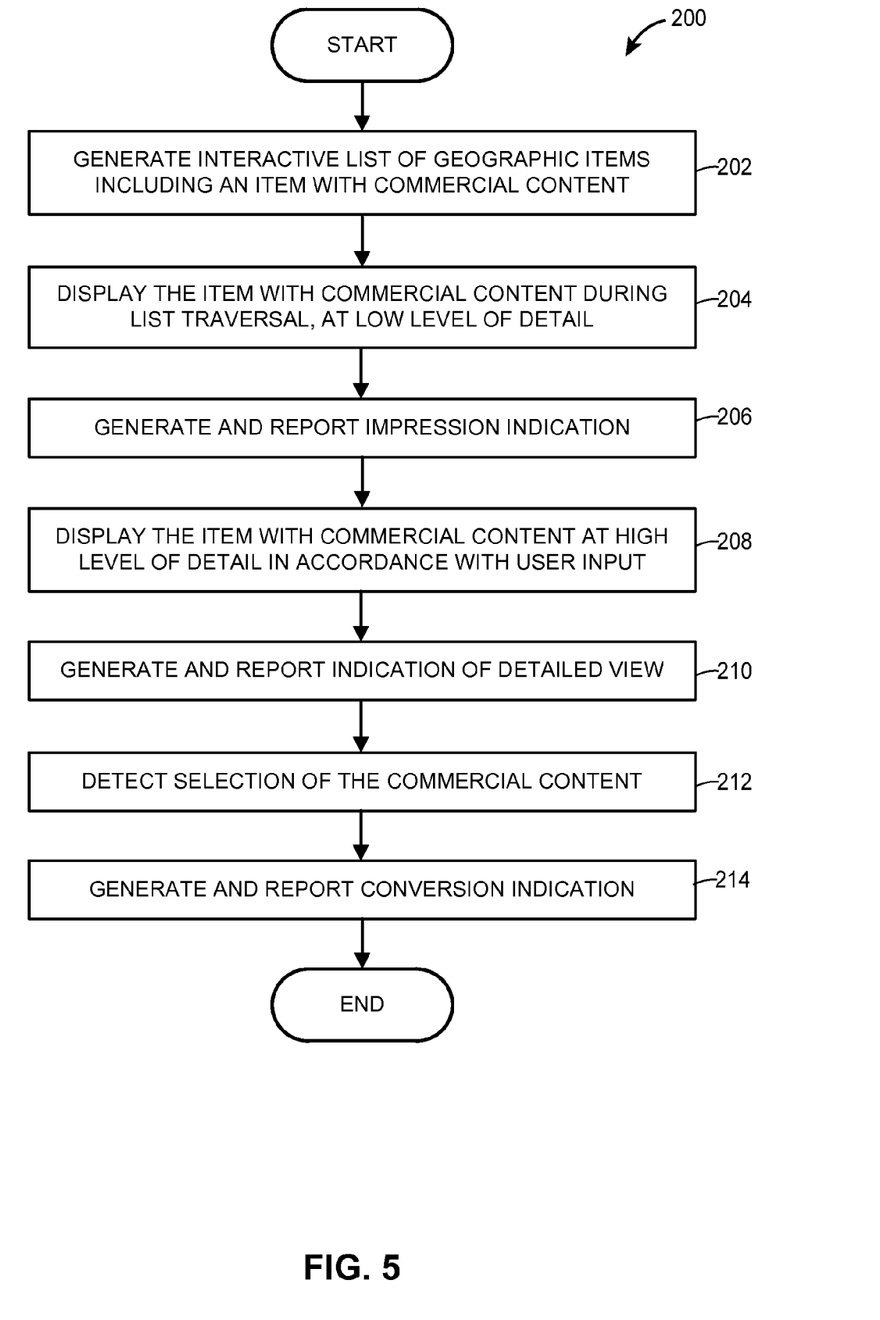
FIG. 5 is a flow diagram of an example method for presenting commercial information at a user device, which can be implemented in the system of FIG. 1.

Now referring to FIG. 5, an example method 200 for presenting commercial information at a user device can be implemented in the user device 12 of FIG. 1, for example, or another suitable device. The method 200 can be implemented as a set of instructions stored on a non-transitory computer-readable medium and executed by one or more processors/computing devices. In one example implementation, the method 200 is implemented as part of the geographic application 14.

The method 200 begins at block 202, where an interactive list of geographic items is generated, including an item with commercial content. For example, referring back to FIG. 1, a user can operate the geographic application 14 to position the map viewport over a certain geographic area and request automatic suggestions related to entertainment, to virtually explore the area. The geographic application 14 can report its current context to a network server, such as the autosuggest server 25 and/or the map data server 20. The current context can indicate, for example, the user's current location, the request for automatic suggestions related to entertainment, the identity of the user's device or the user, etc. In some implementations, the user operates certain controls and/or installs certain applications to enable the geographic application 14 some or all of these parameters to the network server(s).

In addition to the requested automatic suggestions, the geographic application 14 can receive one or more units of commercial content. To continue with the example above, the automatic suggestions can include brief descriptions of highly rated theaters, music venues, arcades, and bars. The commercial content can be an offer to bring five friends to a concert and receive a 50% discount. The geographic application 14 can generate an interactive list of items in which each of the automatic suggestions is presented as a separate item in an informational sheet, and in which the commercial content is presented as one of the items. As discussed above, the list of geographic items in some implementations can be ordered, and the item with commercial content can be assigned a certain position within the ordered list.

With continued reference to FIG. 5, the item with commercial content is displayed as part of the list during the list traversal at block 204. The user may arrive at the item by scrolling through the list, for example. At this point, the item can be presented at a low level of detail. For example, the description of the offer above can include only the name of the concert and the general terms, e.g., "bring five friends and receive a 50% discount." Because the item is presented to the user, an indication of an impression is generated for the offer and reported to a network server at block 206.

Next, at block 208, the item with commercial input is displayed at a higher level of detail. For example, the user may pull the informational sheet upward, speak a voice command to trigger a more detailed view, or otherwise cause the geographic application to provide additional details without yet selecting the commercial content. In the example above, the user may wish to read the details of the offer prior to accepting the offer. In addition to providing additional details in an enlarged informational sheet, for example, the geographic application can generate an indication of a detailed view at block 210. The indication generated at block 210 can indicate to a network server that the commercial content generated at least some user interest upon presentation.

At block 212, the application may detect the selection of commercial content by the user. The geographic application can detect, for example, that the user tapped or clicked on a web link displayed as part of the detailed view of the item with commercial content, activated a certain control in the informational sheet, or otherwise signaled intent to engage with the commercial content. In the example above, the offer may include a link with instructions to click on the link to accept the offer. The geographic application in this case can generate and provide to the network yet another indication. In this case, at block 214, the report can generate and report a conversion indication.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments or implementations are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various implementations, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In implementations in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example implementations, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example implementations, the processor or processors may be located in a single location (e.g., within a home environment, an office environment or as a server farm), while in other implementations the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example implementations, the one or more processors or processor-implemented modules may be located in a single geographic location (e.g., within a home environment, an office environment, or a server farm). In other example implementations, the one or more processors or processor-implemented modules may be distributed across a number of geographic locations (e.g., across one or more data centers).

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like.

These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "one implementation," or "an embodiment"/"one implementation" means that a particular element, feature, structure, or characteristic described in connection with the embodiment or implementation is included in at least one embodiment. The appearances of the phrase "in one embodiment" or "in one implementation" in various places in the specification are not necessarily all referring to the same implementation.

Some implementation may be described using the expression "coupled" and "connected" along with their derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for presenting commercial content in a geographic application through the disclosed principles herein. Thus, while particular implementations and applications have been illustrated and described, it is to be understood that the disclosed implementation are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for monitoring effectiveness of presenting commercial information at user devices, the method comprising:

determining, by one or more computing devices, a current context of a geographic application executing on a user device;

selecting, by the one or more computing devices, commercial geographic content for presentation at the user device based at least in part on the determined current context;

providing, by the one or more computing devices, the commercial geographic content to the user device via a communication network;

receiving, by the one or more computing devices from the user device, a first indication indicating that the commercial geographic content was presented at a first level of detail via a user interface of the user device;

updating, by the one or more computing devices, a first metric in response to the first indication, the first metric being indicative of a number of impressions of the commercial geographic content;

receiving, by the one or more computing devices from the user device, a second indication indicating that the commercial geographic content was presented at a second level of detail via the user interface of the user device in response to user input, wherein the second level of detail is higher than the first level of detail; and updating, by the one or more computing devices, a second metric in response to the second indication, the second metric being indicative of a number of detailed presentations of the commercial geographic content.

2. The method of claim 1, further comprising:

receiving, by the one or more computing devices from the user device, a third indication indicating that the user selected the commercial geographic content via the user interface; and updating, by the one or more computing devices, a third metric in response to the third indication, the third metric being indicative of a number of conversions of the commercial geographic content.

3. The method of claim 1, further comprising:

generating, by the one or more computing devices, a charge for a provider of the commercial content in response to the second indication.

4. The method of claim 1, wherein:

determining the current context of the geographic application includes receiving a geographic query from the user device, the geographic query indicating at least a geographic area and one or more geographic search terms, and selecting the commercial geographic content includes selecting content related to the geographic area and to at least one of the one or more geographic search terms.

5. The method of claim 4, further comprising:

generating, by the one or more computing devices, an ordered list of geographic items in response to the geographic query, wherein providing the commercial geographic content to the user device includes providing the commercial geographic content along with the ordered list of geographic items.

6. The method of claim 1, wherein:

determining the current context of the geographic application includes receiving a request for automatic suggestions from the user device, the request indicating at least a geographic area, and selecting the commercial geographic content includes selecting content related to the geographic area;

the method further comprising:
generating, by one or more computing devices, a list of geographic suggestions in response to the request for automatic suggestions, and
providing the commercial geographic content to the user device along with the list of geographic suggestions.

7. The method of claim 1, wherein the determined current context indicates at least a geographic area, and wherein the selecting the commercial geographic content includes selecting one of:
an advertisement for a good or a service related to the geographic area,
a coupon for a good or a service related to the geographic area, or
an offer for a commercial transaction related to the geographic area.

8. A system comprising:
a database implemented in a non-transitory computer-readable medium storing commercial geographic content for presentation at user devices;
a network interface to access a user device via a communication network;
processing hardware coupled to the database and the network interface, the processing hardware configured to:
select commercial geographic content from the database for presentation at the user device,
provide the commercial geographic content to the user device via the network interface,
receive, via the network interface from the user device, a first indication indicating that the commercial geographic content was presented at a first level of detail via a user interface of the user device,
update a first metric in response to the first indication, the first metric being indicative of a number of impressions of the commercial geographic content,
receive, via the network interface from the user device, a second indication indicating that the commercial geographic content was presented at a second level of detail via the user interface of the user device in response to user input, wherein the second level of detail is higher than the first level of detail, and
update a second metric in response to the second indication, the second metric being indicative of a number of detailed presentations of the commercial geographic content.

9. The system of claim 8, wherein the processing hardware is further configured to:
receive, via the network interface from the user device, a third indication indicating that the user selected the commercial geographic content via the user interface, and
update a third metric in response to the third indication, the third metric being indicative of a number of conversions of the commercial geographic content.

10. The system of claim 8, wherein the processing hardware is further configured to:
generate a charge for a provider of the commercial content in response to the second indication.

11. The system of claim 8, wherein the processing hardware is further configured to:
determining a current context of a geographic application executing on the user device, and
select the commercial geographic content based at least in part on the determined current context.

12. The system of claim 11, wherein to determine the current context of the geographic application, the processing hardware is configured to:
receiving a geographic query from the user device, the geographic query indicating at least a geographic area and one or more geographic search terms, and
select the commercial content that is related to the geographic area and to at least one of the one or more geographic search terms.

13. The system of claim 11, wherein to determine the current context of the geographic application, the processing hardware is configured to:
receive a request for automatic suggestions from the user device, the request indicating at least a geographic area, and
selecting the commercial geographic that is related to the geographic area;
wherein the processing hardware is further configured to:
generate a list of geographic suggestions in response to the request for automatic suggestions, and
provide the commercial geographic content to the user device along with the list of geographic suggestions.

14. The system of claim 8, wherein the determined current context indicates at least a geographic area, and wherein to select the commercial geographic content, the processing hardware selects one of:
an advertisement for a good or a service related to the geographic area,
a coupon for a good or a service related to the geographic area, or
an offer for a commercial transaction related to the geographic area.

15. A method for providing commercial information in a geographic application, the method comprising:
receiving, by one or more processors via a communication network, commercial content related to a current geographic context, wherein the current geographic context includes at least a geographic area of interest;
receiving, by the one or more processors via the communication interface, a plurality of geographic items organized into a list having an order, wherein each of the plurality of geographic items relates to a location within the geographic area of interest; and
providing, by the one or more processors via the user interface, a sequence of informational sheets in accordance with the order of the list, wherein each of the informational sheets corresponds to a respective one of the plurality of geographic items, including:
inserting the informational sheet with the commercial content into the sequence,
providing, by the one or more processors via a user interface, an informational sheet with the commercial content at a first level of detail,
detecting, by the one or more processors, a request for additional detail related to the informational sheet, and
in response to the request for additional detail: (i) providing, by the one or more processors via the user interface, the informational sheet with the commercial geographic content at a second level of detail, wherein the second level is higher than the first level of detail, and (ii) transmitting, to the network server, an indication of the commercial content being displayed at a second level of detail.

16. The method of claim 15, wherein:
providing the informational sheet with the commercial content at the first level of detail includes placing the informational sheet at a first position over a digital map to obscure a first portion of the digital map, providing the informational sheet with the commercial content at the second level of detail includes placing the informational sheet at a second position over the digital map to obscure a second portion of the digital map, wherein the second portion is larger than the first portion.

17. The method of claim 16, wherein:

detecting the request for additional detail includes detecting a user gesture applied to the informational sheet, the gesture including a motion along a certain direction, and placing the informational sheet at the second position over the digital map includes enlarging the informational sheet along the direction of the motion.

18. The method of claim 15, further comprising:

detecting, by the one or more processors, a user selection of the commercial content via the user interface;

in response to the user selection, transmitting, to the network server, an indication of the commercial content being selected.

* * * * *